(12) United States Patent
Block et al.

(10) Patent No.: US 12,223,492 B2
(45) Date of Patent: Feb. 11, 2025

(54) PAYMENT ACCESSIBILITY NOTIFICATIONS

(71) Applicant: American Express Travel Related Services Company, Inc., New York, NY (US)

(72) Inventors: Joshua Block, New York, NY (US); Lauren Chmielewski, Phoenix, AZ (US); Alaric M. Eby, Phoenix, AZ (US); Andras L. Ferenczi, Phoenix, AZ (US); Magdalena Selma, New York, NY (US)

(73) Assignee: American Express Travel Related Services Company, Inc., New York, NY (US)

( * ) Notice: Subject to any disclaimer, the term of this patent is extended or adjusted under 35 U.S.C. 154(b) by 295 days.

(21) Appl. No.: 17/704,685

(22) Filed: Mar. 25, 2022

(65) Prior Publication Data

US 2023/0306405 A1 Sep. 28, 2023

(51) Int. Cl.
*G06Q 20/32* (2012.01)
*G06Q 20/20* (2012.01)
(52) U.S. Cl.
CPC ......... *G06Q 20/325* (2013.01); *G06Q 20/202* (2013.01)

(58) Field of Classification Search
CPC .. G06Q 20/325; G06Q 20/202; G06Q 20/322; G06Q 20/326; G06Q 20/20
See application file for complete search history.

(56) References Cited

U.S. PATENT DOCUMENTS

| | | | |
|---|---|---|---|
| 2011/0184853 A1* | 7/2011 | Mark | G06Q 40/02 709/206 |
| 2017/0091753 A1* | 3/2017 | May | G06Q 20/405 |

* cited by examiner

*Primary Examiner* — A. Hunter Wilder
(74) *Attorney, Agent, or Firm* — Thomas | Horstemeyer, LLP

(57) ABSTRACT

Disclosed are various embodiments for generating payment accessibility notifications for individuals with impairments. In one non-limiting example, a system includes a first computing device configured to identify a second computing device using a wireless communication protocol in a store location. A first notification for the first computing device is activated based at least in part on an accessibility type. A user interface is displayed for receiving client data, and the client data includes a product entered by a user. An expected amount is determined for the product based at least in part on the client data and transmitted to the second computing device. A pending amount for the product is received from the second computing device. A second notification is activated for the first computing device prior to a completion of the purchase based at least in part on the pending amount and the expected amount.

20 Claims, 5 Drawing Sheets

PAYMENT ACCESSIBILITY NOTIFICATIONS

BACKGROUND

Individuals with an impairment have unique challenges while purchasing products in a store. For example, individuals with vision impairments may have difficulty reading price tags or identifying a desired product. Individuals with learning impairments may have a challenge understanding how much they need to pay for an item based on a condition of a promotion.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The various embodiments of the present disclosure relate to generating payment accessibility notifications for individuals with impairments. Individuals can voluntarily choose to share their device data that enables payment accessibility notifications. Additionally, these individuals can enable or disable payment accessibility notifications at any time. The payment accessibility notifications can be used by individuals with impairments to identify suspicious transactions prior to providing payment credentials or after the completion of a transaction.

Individuals with impairments have unique challenges while shopping in person at stores. For example, visually impaired individuals may find it difficult to verify the accuracy of a transaction while shopping in a physical retail store. These individuals can be concerned with a merchant accidentally charging incorrect amounts or selling them the wrong product. If a transaction dispute does occur, these individuals may be at a disadvantage because of their impairment. For example, a visually impaired individual may have difficulty reviewing the details of the transaction on a receipt. In other instances, individuals with impairments may not detect a problem with the transaction until after they have left the store location. In the following discussion, a general description of the system and its components is provided, followed by a discussion of the operation of the same.

Figure 1:
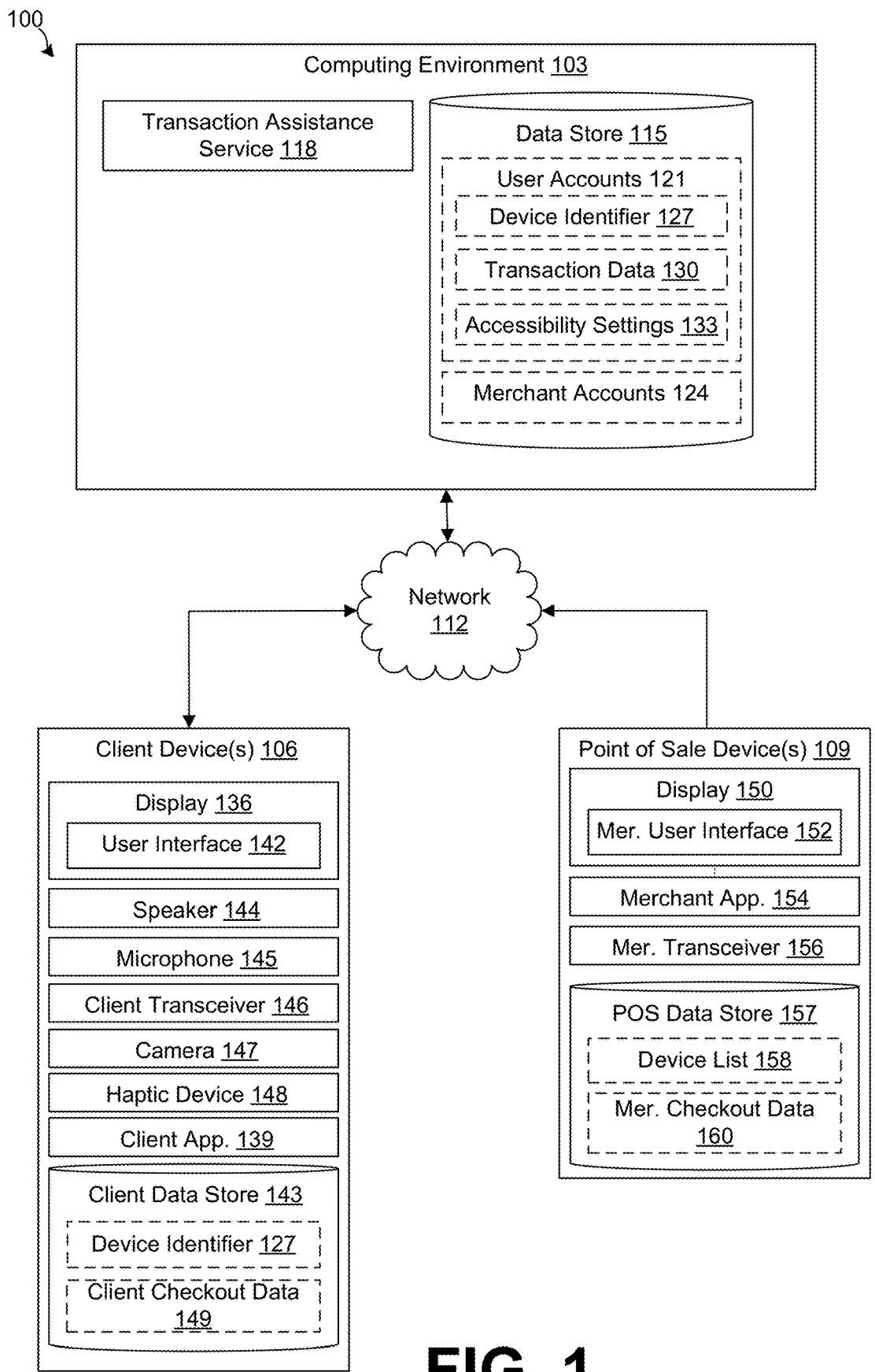
FIG. 1 is a drawing of a networked environment according to various embodiments of the present disclosure.

With reference to FIG. 1, shown is a networked environment 100 according to various embodiments. The networked environment 100 includes a computing environment 103, a client device 106, and a point of sale (POS) device 109, which are in data communication with each other via a network 112. The network 112 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 103 may comprise, for example, a server computer or any other system providing computing capability. Alternatively, the computing environment 103 may employ a plurality of computing devices that may be arranged, for example, in one or more server banks or computer banks or other arrangements. Such computing devices may be located in a single installation or may be distributed among many different geographical locations. For example, the computing environment 103 may include a plurality of computing devices that together may comprise a hosted computing resource, a grid computing resource and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in a data store 115 that is accessible to the computing environment 103. The data store 115 may be representative of a plurality of data stores 115 as can be appreciated. The data stored in the data store 115, for example, is associated with the operation of the various applications and/or functional entities described below.

The components executed on the computing environment 103, for example, may include transaction assistance service 118, and other applications, services, processes, systems, engines, or functionality not discussed in detail herein. The transaction assistance service 118 is executed to facilitate notifications that inform individuals with impairments of suspicious transactions. In some non-limiting examples, the transaction assistance service 118 can be executed to provide notifications of a suspicious pending transaction prior to an individual providing a payment device (e.g., cash, credit card, debit card, contactless credentials, etc.) or after a transaction has been completed.

For example, the transaction assistance service 118 can receive an expected payment amount from a client device 106 and a pending purchase amount from the POS device 109. The transaction assistance service 118 can transmit a notification to the client device 106 of an individual with an impairment if the difference between the expected payment amount and the pending purchase amount exceeds a threshold amount. Additionally, in a post transaction example, the transaction assistance service 118 can also transmit notifications based on the difference between a posted transaction and the expected payment amount.

The data stored in the data store 115 includes, for example, user accounts 121, merchant accounts 124, and potentially other data. Each user account 121 can represent a user profile of an individual that has registered having an impairment. Some non-limiting examples of impairments can include a vision impairment, a learning impairment, a hearing impairment, a mobility disability, and other possible impairments or disabilities. The user accounts 121 can include device identifiers 127, transaction data 130, accessibility settings 133, and other potential data.

The device identifier 127 can represent a unique identifier for a client device 106. The transaction data 130 can represent data associated with pending purchase transactions and completed transactions. The accessibility settings 133 can include one or more indicators for the types of disabilities and impairments for an individual. Based on the accessibility settings 133, the client device 106 can generate appropriate notifications for an individual. For example, an individual with a vision impairment will have a particular accessibility setting 133. Based on their accessibility setting 133, the client device 106 may generate an audible notification or a haptic-based notification. In another example, the client device 106 may generate a visual flashing notification and/or a haptic-based notification if the individual has a hearing impairment. The accessibility settings 133 can also include user preferences for notifications and other features.

The merchant account 134 can represent a profile for one or more merchants. Each merchant account 134 can include geolocation data for store locations, POS device identifiers associated with each store location, transaction data 130 associated with each store location, and other potential data. The geolocation data can include geographical boundary limits for each store location.

The data from the merchant accounts 134 can be transmitted to the client device 106. For example, the client device 106 can use the geolocation data to detect when the client device 106 is in a particular store location. The geolocation data may also include a store layout and a location of POS devices 109 in the store layout. As such, the client device 106 can determine when it is located within a defined distance of proximity to the POS device 109. Being within a defined distance from the POS device 109, the client device 106 can determine the individual is approaching the POS device 109 to make a purchase or the individual is in line to make a purchase.

The client device 106 is representative of a plurality of client devices that may be coupled to the network 112. The client device 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 106 may include a display 136. The display 136 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 106 may be configured to execute various applications such as a client application 139 and/or other applications. The client application 139 can be used to facilitate various notifications for notifying an individual with an impairment of suspicious transactions. The client application 139 can be used to display user interfaces 142 for determining an expected payment amount and notifying an individual of transactions that seem unreasonably high. The client application 139 may also be executed in a client device 106, for example, to access network content served up by the computing environment 103 and/or other servers, thereby rendering the user interface 142 on the display 136. To this end, the client application 139 may comprise, for example, a browser, a dedicated application, etc., and the user interface 142 may comprise a network page, an application screen, etc. The client device 106 may be configured to execute applications beyond the client application 139 such as, for example, email applications, social networking applications, word processors, spreadsheets, and/or other applications.

The client device 106 can also include a speaker 144, a microphone 145, a client transceiver 146, a camera 147, a haptic device 148, and other suitable components. The speaker 144 can be used for playback of an audible notification. The client transceiver 146 can be used to communicate via one or more wireless communication protocols, such as Bluetooth, Wi-Fi, Zigbee, Z-wave, and other suitable wireless communication protocols. The haptic device 148 can be used to cause various haptic notifications (e.g., vibrations) for a client device 106.

The client device 106 can also include a client data store 143 that stores data such as device identifier 127 and client checkout data 149. The client checkout data 149 can represent items that an individual has selected for purchase and an expected payment amount during a shopping visit. In some instances, the expected payment amount can represent a summation of entry amounts for each item that an individual has selected to purchase.

The POS device 109 can be a device that is used by a merchant to conduct transactions with customers at a merchant location. The POS device 109 can be representative of a plurality of POS devices that may be coupled to the network 112. The POS device 109 may comprise, for example, a processor-based system such as a computer system. Such a computer system may be embodied in the form of a desktop computer, a laptop computer, personal digital assistants, cellular telephones, smartphones, web pads, tablet computer systems, game consoles, electronic book readers, or other devices with like capability. The POS device 109 may include a display 150. The display 150 may comprise, for example, one or more devices such as liquid crystal display (LCD) displays, organic light emitting diode (OLED) displays, LCD projectors, or other types of display devices, etc. The display 150 can render a merchant user interface 152 for assisting individuals with impairments in a store.

The POS device 109 may be configured to execute various applications such as a merchant application 154 and/or other applications. The merchant application 154 can be used to display various merchant user interfaces 152 on the POS device 109. The merchant application 154 can also be in communication with the transaction assistant service 118 for facilitating notifications to individuals with impairments in the store.

The POS device 109 can include a merchant transceiver 156 for communicating with other devices in the networked environment 100 via a wireless communication protocol. The POS device 109 may include a POS data store 157 that stores data such as a device list 158 and merchant checkout data 160. The device list 158 can represent a list of client devices 106 of individuals with impairments in the store location. The device list 158 may include the device identifiers 127 of the client device 106. The merchant checkout data 160 can represent expected payment amounts received from client devices 106, transaction data 130, client checkout data 149, and other suitable data.

Next, a general description of the operation of the various components of the networked environment 100 is provided.

A more detailed description of the operation of individual components is provided in the discussion accompanying the subsequent figures.

To begin, an individual with a visual impairment (e.g., legally blind) can enter a merchant location. For example, upon entering the merchant location for Grocery Store ABC, the client device 106 can detect that it is located within a geofence boundary for Grocery Store ABC. The client device 106 can then play a shopping cart notification via the speaker 144. The shopping cart notification can be an audible announcement of "You are located at Grocery Store ABC. You may now add items to your cart."

The individual can select to add various items, such as a quart of milk and a bottle of soda. The individual can enter these items and their expected amounts by providing audible commands or by using the user interface 142. In some examples, the expected amount represents an amount the individual expects to pay for the item. The client application 139 can determine an expected payment amount that represents a total of the expected amounts for the items. In some examples, the individual may use the user interface 142 to enter the actual price of the item. In other examples, the individual may use the user interface 142 to enter an estimate price for the item. The client application 139 can send the expected payment amount to the POS device 109 as the individual approaches the POS device 109.

The merchant can scan the items at the POS device 109 and generate a pending purchase amount. The POS device 109 can transmit the pending purchase amount to the client device 106. The client application 139 can determine if the pending purchase amount is within a margin of error of the expected purchase amount. If the pending purchase amount is outside of the margin of error, the client application 139 can activate an audible notification for the individual. The notification can prompt a conversation between the merchant and the individual to discuss a correction or why the pending purchase amount is higher than expected. After the conversation, the individual can determine whether to approve the transaction or reject it. In other examples, the client device 106 can generate a notification after the transaction has been completed. The individual can decide whether to dispute the transaction through the client application 139 or in person at the merchant location.

Figure 2A:
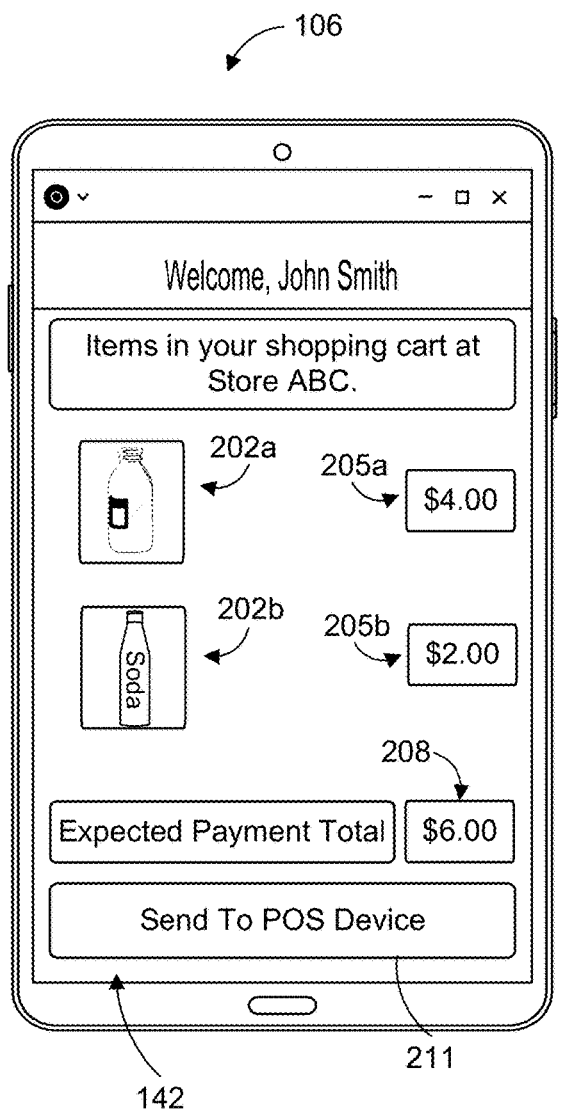
FIGS. 2A and 2B are pictorial diagrams of example user interfaces displayed by devices in the networked environment of FIG. 1 according to various embodiments of the present disclosure.

Referring next to FIG. 2A, shown is an example of a user interface 142 displayed by a client device 106. The user interface 142 can be used by individuals with impairments to enter items 202a, 202b (collectively "items 202" and generically "item 202") and expected item amounts 205a, 205b (collectively "expected item amounts 205" and generically "expected item amounts 205") while shopping in a store location. The items 202 can be products available for purchase in a store location. In some examples, the expected item amounts 205 can be entered manually or verbally by input from an individual operating the client device 106. The expected item amounts 205 can be summed together for an expected payment amount 208. The user interface 142 can also include a user interface element 211 (e.g., a button) for transmitting the expected item amounts 205, the items 202, the expected payment amount 208, and other data to the POS device 109 during a shopping visit at a store location.

Figure 2B:
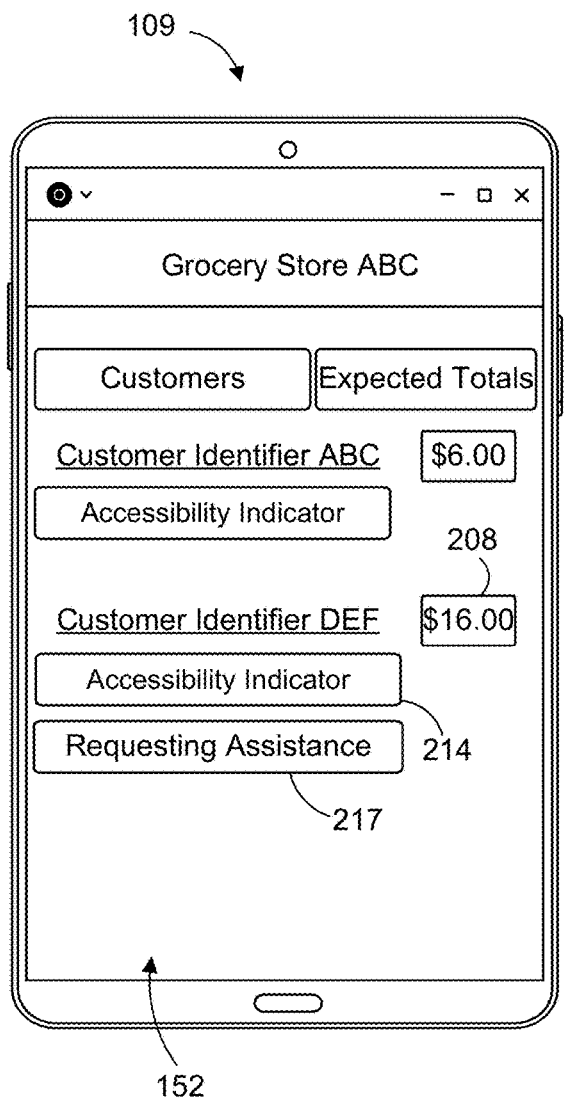

Turning now to FIG. 2B, shown is an example of a merchant user interface 152 displayed by the POS device 109. The merchant user interface 152 can include a list of customers in the store that have opted into an impairment program for sharing their device data. As such, customers who have chosen not to participate or who do not have an impairment would not be shown in the merchant user interface 152.

In the illustrated example of FIG. 2B, under the "Grocery Store ABC" section for the POS device 109, the "Customer Identifier ABC" corresponds to the user interface 142 of client device 106 shown in FIG. 2A. For each customer identifier, the merchant user interface 152 can include the expected payment amount 208, an accessibility indicator 214, a request for assistance indicator 217, and other components. The accessibility indicator 214 can be used to display one or more impairments or disabilities voluntarily shared by the user account 121 of the client device 106. For example, an individual may want to share that they have a hearing impairment with the merchant employees. The request for assistance indicator 217 can be a visual indicator that is displayed when an individual has requested assistance in the store.

Figure 3:
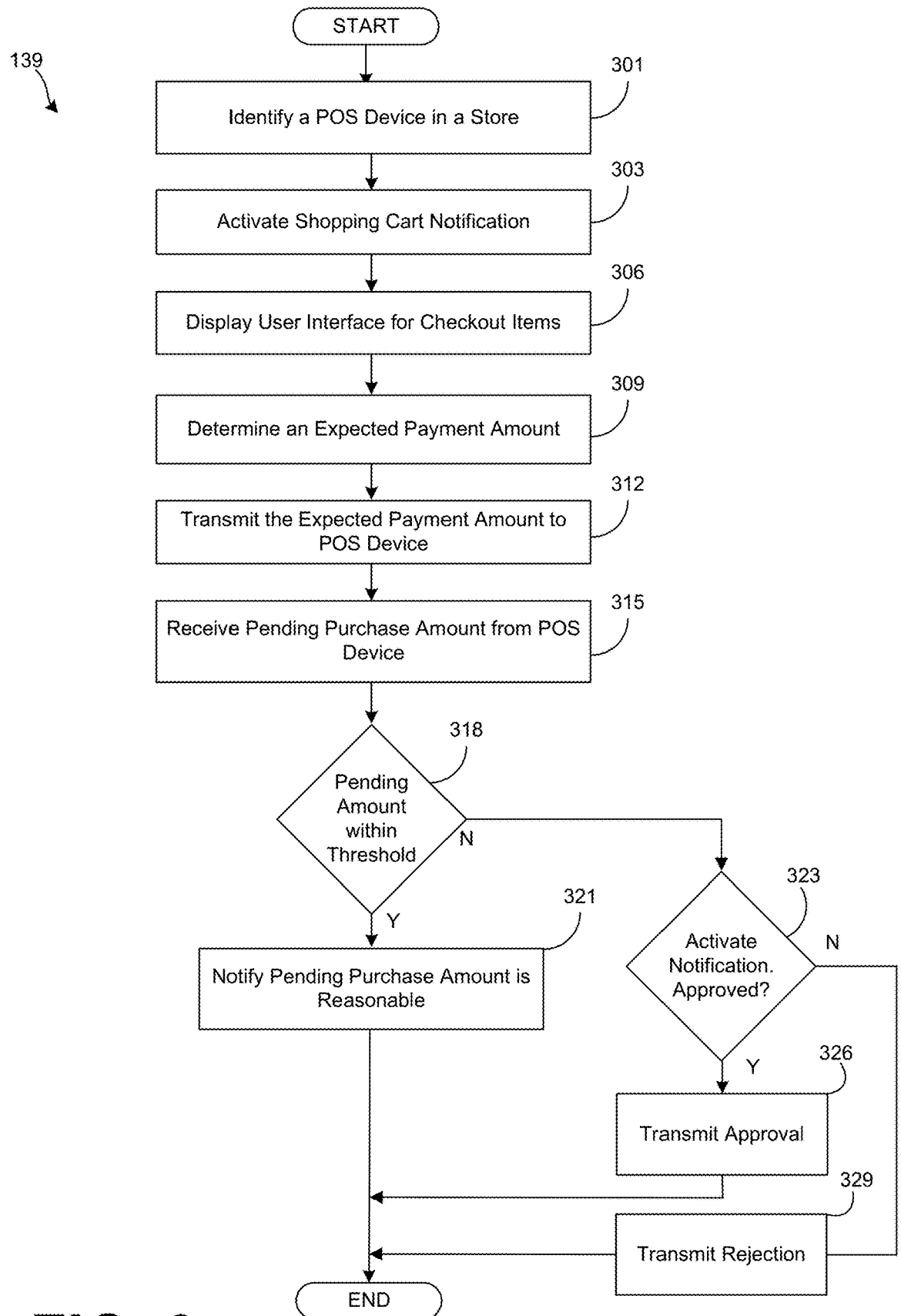
FIG. 3 is a flowchart illustrating one example of functionality implemented as portions of a client application executed in a client device in the networked environment of FIG. 1 according to various embodiments of the present disclosure.

Moving on to FIG. 3, shown is a flowchart that provides one example of the operation of a portion of the client application 139 according to various embodiments. It is understood that the flowchart of FIG. 3 provides merely an example of the many different types of functional arrangements that may be employed to implement the operation of the portion of the client application 139 as described herein. As an alternative, the flowchart of FIG. 3 may be viewed as depicting an example of elements of a method implemented in the client device 106 (FIG. 1) according to one or more embodiments.

Beginning with box 301, the client application 139 can identify a POS device 109 at a store location. In some embodiments, the client device 106 can have geolocation data for a store location and can determine that the client device location is within a geolocation boundary (e.g., a geofence) for the store location. Upon entering the geolocation boundary for the store location, the client device 106 can activate a client transceiver 146 to detect POS devices 109 in the store. In some examples, the geolocation data can store a store layout, a location of a checkout area, or a location of the POS devices 109 in a store. Upon identifying the POS device 109, the client device 106 and the POS device 109 can generate a communication session.

In box 303, the client application 139 can activate a shopping cart notification for the client device 106. In some embodiments, the shopping cart notification can be activated upon the detection of entering the store location or the identification of the POS device 109. The shopping cart notification can be a vibration, an audible sound, a visual indicator, or other suitable types of notifications. The type of notification used can be based on the accessibility settings 133. For example, a visually impaired individual may have a shopping cart notification that plays an audio file that states "You are now shopping at Grocery Store ABC. What would you like to add to you cart?" Individuals with other impairments or disabilities may have a different notification method employed.

In box 306, the client application 139 can display a user interface 142 for receiving an entry of items 202 that the individual wants to purchase (e.g., client checkout data 149). The individual can enter the items 202 by manipulating the user interface 142 (e.g., entering text, selecting an item from menu), by providing audio instructions that are received by the microphone of the client device 106, and other suitable data entry methods. In addition to entering each item 202, the individual can enter an expected item amount 205 for the item 202. In another example, the client application 139 can use the camera 147 to capture an image of the item 202 for identification. After capturing the image of the item 202, the client application 139 can generate an expected item amount based on a pricing history (e.g., at the merchant store, an industry average price, pricing history for client device 106 at other stores).

In box 309, the client application 139 can determine the expected payment amount 208 from the items 202 and the expected item amounts. The expected item amounts 205 can be summed up to generate an expected payment amount 208. In some examples, the expected payment amount 208 may include taxes and other fees.

In box 312, the client application 139 can transmit the expected payment amount 208 to the POS device 109 (e.g., client checkout data 149). In some embodiments, the expected payment amount 208 can be dynamically sent to the POS device 109 as entries for items 202 are made. In other embodiments, the client device 106 can transmit the expected payment amount 208 in response to a user interface element 211 being clicked or an audible instruction being received by the client device 106. In other embodiments, the expected payment amount 208 can automatically be transmitted in response to the client device 106 being within a predefined distance of proximity (e.g., 10 feet) of the POS device 109.

In box 315, the client application 139 can receive a pending purchase amount from the POS device 109. The pending purchase amount can represent an amount owed by the individual as the items 202 are identified (e.g., scanning the items 202) by the POS device 109. Accordingly, in some embodiments, the pending purchase amount is received prior to the individual providing payment information (e.g., credit card, debit card, contactless payment data) or providing a monetary currency.

In box 318, the client application 139 can determine whether the pending purchase amount is within a threshold. For example, the client application 139 can determine a difference between the pending purchase amount and the expected payment amount 208. The client application 139 can determine if the difference is within a set threshold range (e.g., a margin of error). If the pending purchase amount is within a reasonable amount, the client application 139 proceeds to box 321. If the pending purchase amount is not within the set threshold range, the client application 139 can proceed to the box 323.

In box 321, the client application 139 can generate an approval notification that the pending purchase amount is reasonable. The type of notification can be selected based on the accessibility settings 133.

In box 323, the client application 139 can activate a transaction notification that indicates that the pending purchase amount is not within the threshold range. In some embodiments, the transaction notification can prompt the individual with an option for approving the pending purchase amount. For example, the user interface 142 can display a user interface approval component for the individual to select. In another example, the individual may provide an audible command to approve the transaction. The prompt for approval gives the individual and the merchant time to discuss why the pending purchase amount is higher than expected. After the discussion, the individual can decide whether to proceed with the transaction or walk away. If the transaction is approved, the client application 139 can proceed to box 326. If the transaction is rejected, the client application 139 can proceed to box 329.

In box 326, the client application 139 can transmit an approval indication to the POS device 109. Thus, the transaction is approved and the client application 139 can proceed to purchase the items 202 and then proceed to completion. In contrast, at box 329, the client application 139 can transmit a rejection indication. Thus, the transaction is cancelled. Then, the client application 139 can proceed to completion.

Figure 4:
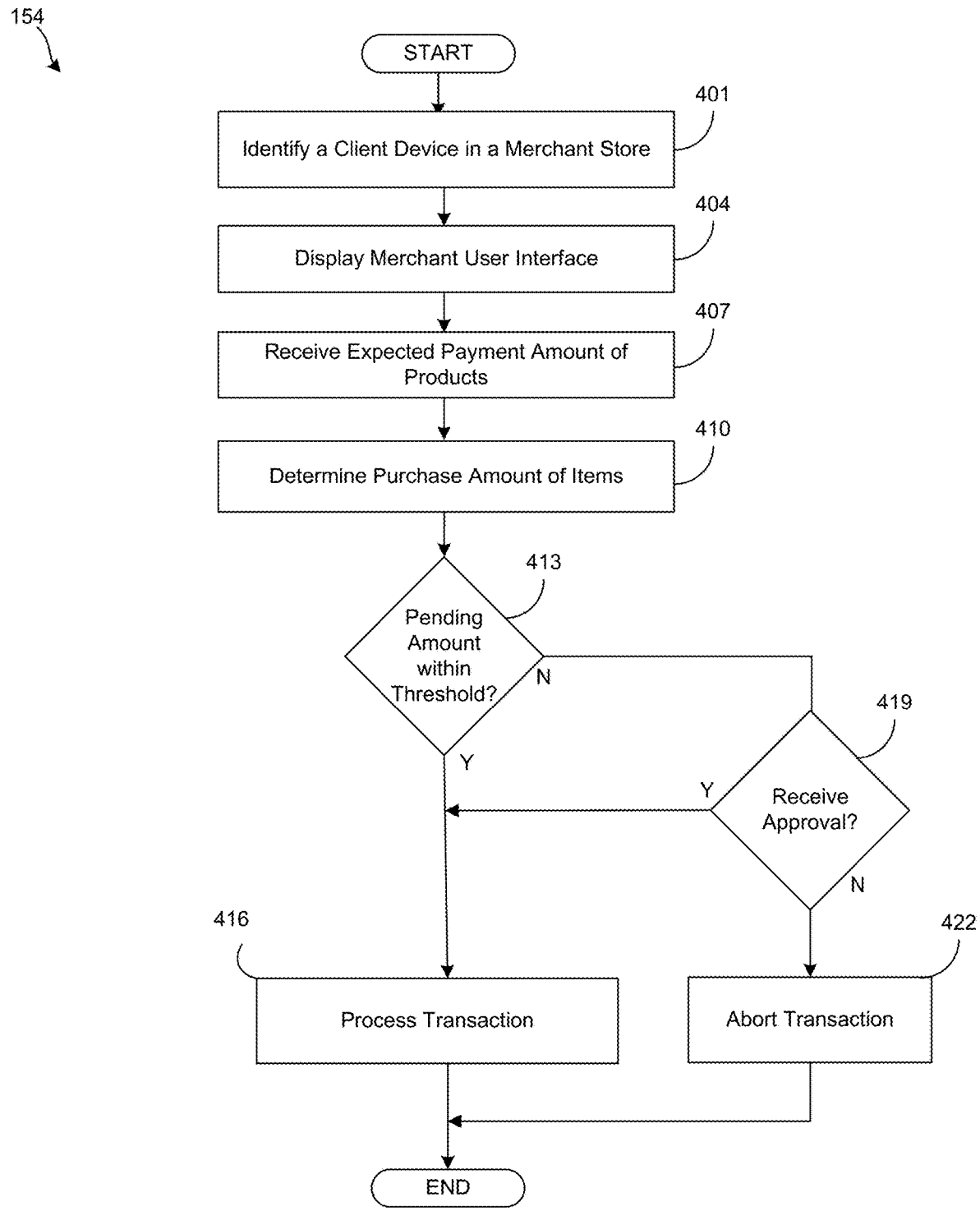
FIG. 4 is a flowchart illustrating one example of functionality implemented as portions of a merchant application executed in a point of sale device in the networked environment of FIG. 1 according to various embodiments of the present disclosure.

Referring next to FIG. 4, shown is a flowchart that provides one example of the operation of a portion of the merchant application 154 according to various embodiments. It is understood that the flowchart of FIG. 4 provides merely an example of the many different types of functional arrangements that may be employed to implement the operation of the portion of the merchant application 154 as described herein. As an alternative, the flowchart of FIG. 4 may be viewed as depicting an example of elements of a method implemented in the POS device 109 (FIG. 1) according to one or more embodiments.

Beginning with box 401, the merchant application 154 can identify a client device 106 that has entered the store location via a wireless communication protocol. The merchant application 154 can establish a communication session with the client device 106. The merchant application 154 can receive a device identifier 127 and accessibility settings 133 from the client device 106.

In box 404, the merchant application 154 can display a merchant user interface 152. The merchant user interface 152 can include a device list 158 of the client devices 106 (e.g., list of device identifiers 127) presently in the store location. Each client device 106 can have accessibility settings 133 (e.g., an indication of a vision impairment) displayed in the merchant user interface 152. While shopping, individuals can use their client device 106 to trigger a request for assistance.

In box 407, the merchant application 154 can receive an expected payment amount from the client device 106. In some examples, the client device 106 can transmit the expected payment amount when the client device 106 is located within a proximity distance from the POS device 109.

In box 410, the merchant application 154 can determine a pending purchase amount of the items 202 an individual desires to purchase. The POS device 109 can enter items 202 for purchase by scanning each item 202. The pending purchase amount can represent a summation of all of the items 202 scanned by the POS device 109.

In box 413, the merchant application 154 can determine whether the pending purchase amount and the expected purchase amount are within a threshold. For example, the merchant application 154 can a determine a difference between the pending purchase amount and the expected purchase amount. The merchant application 154 can determine whether the difference is within a threshold (e.g., a margin of error). If the difference is within the threshold, the merchant application 154 can proceed to box 416. If the difference is not within the threshold, the merchant application 154 can proceed to box 419.

In box 416, the merchant application 154 can proceed to process the transaction as a typical purchase. In box 419, the merchant application 154 can wait to receive approval of the pending purchase amount. In some examples, the merchant may receive verbal approval. In other examples, the POS device 109 may receive approval from the client device 106, which has been triggered and approved by the individual.

In box 422, the merchant application 154 can abort the transaction if a rejection has been received. The rejection can be received verbally by the individual or the rejection can be received by the client device 106. Then, the client application can proceed to completion.

Figure 5:
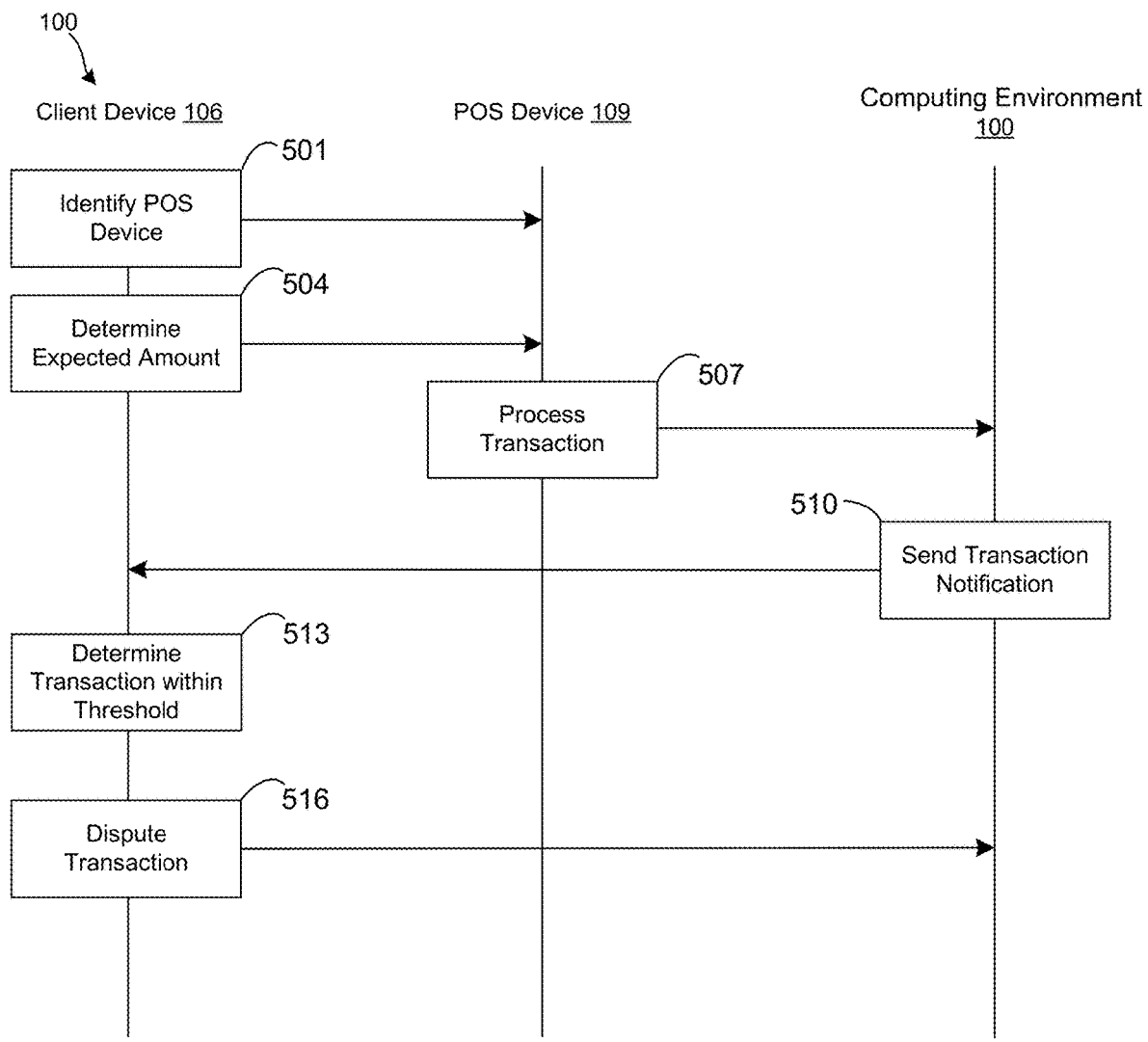
FIG. 5 is a sequence diagram of operations performed in the networked environment of FIG. 1 according to various embodiments of the present disclosure.

Referring next to FIG. 5, shown is a sequence diagram that provides one example of the operations of a portion of the various components of the networked environment 100 according to various embodiments. It is understood that the sequence diagram of FIG. 5 provides merely an example of the many different types of functional arrangements that may be employed to implement the operations of the networked environment 100 as described herein. As an alternative, the sequence diagram of FIG. 5 may be viewed as depicting an example of elements of a method implemented within the networked environment 100 (FIG. 1) according to one or more embodiments.

Beginning with box 501, the client device 106 of an individual can enter a geolocation boundary (e.g., a geofence boundary) of a store location. In some embodiments, the client device 106 can have geolocation data for a store location and can determine that the client device location is within a geolocation boundary for the store location. Upon entering the geolocation boundary for the store location, the client device 106 can activate a client transceiver 146 to detect POS devices 109 in the store. In some examples, the geolocation data can include a store layout, a location of a checkout area, or a location of POS devices 109 in a store. Upon identifying the POS device 109, the client device 106 and the POS device 109 can generate a communication session.

In box 504, the client device 106 can activate a shopping cart notification. In some embodiments, the shopping cart notification can be activated upon the detection of entering the store location or the identification of the POS device 109. The shopping cart notification can be a vibration, an audible sound, a visual indicator, or other suitable notification types.

The client device 106 can display a user interface 142 for receiving an entry of items 202 that the individual wants to purchase (e.g., client checkout data 149). The individual can enter the items 202 by manipulating the user interface 142 (e.g., entering text, selecting an item from menu, etc.), by providing audio instructions that are received by the microphone 145 of the client device 106, and other suitable data entry methods. In addition to entering each item 202, the individual can enter an expected item amount 205 for the item 202.

The client device 106 can determine the expected payment amount 208 from the items 202 and the expected item amounts 205. The expected item amounts 205 can be summed up to generate an expected payment amount 208. The client device 106 can transmit the expected payment amount 208 to the POS device 109 (e.g., client checkout data 149). In some embodiments, the expected payment amount 208 can be dynamically sent to the POS device 109 as entries for items 202 are made. In other embodiments, the client device 106 can transmit the expected payment amount 208 in response to a user interface element 211 being clicked on or an audio instruction being received by the client device 106. In other embodiments, the expected payment amount 208 can automatically be transmitted in response to the client device 106 being within a predefined proximity (e.g., 10 feet) of the POS device 109.

In box 507, the POS device 109 can process a transaction for the items 202. The transaction data 130 can be transmitted to the computing environment 103. The transaction data 130 can include the device identifier 127, the purchased amount for the items 202 and other potential data.

In box 510, the computing environment 103 can transmit the transaction data 130 to the client device 106. In some embodiments, the computing environment 103 can determine a difference between the purchased amount and the expected purchase amount. When the difference exceeds a threshold, the computing environment 103 can instruct the client device 106 to activate a notification.

In box 513, the client device 106 can receive the transaction data 130 and determine whether the purchased amount exceeds a threshold. The client device 106 can determine a difference between the purchased amount and the expected purchase amount to compare to the threshold.

In box 516, the client device 106 can activate a transaction notification to notify the individual when the difference between the expected pending amount and the purchase amount exceeds the threshold. In one example, the client device 106 can display the user interface 142 that includes the transaction notification. The user interface 142 can also include a dispute user interface element. Upon a click of the dispute user interface element, the client device 106 can transmit a dispute message to the computing environment 103. Then, the client application can proceed to completion.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts and sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts and sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 103.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
    a transceiver device;
    a first computing device that comprises a processor and memory; and
    machine-readable instructions stored in the memory that, when executed by the processor, cause the first computing device to at least:
        identify the first computing device is located within a geolocation boundary for a store location based at least in part on location data associated with the first computing device;
        activate the transceiver device to detect a second computing device at the store location using a wireless communication protocol of the transceiver device based at least in part on the first computing device being located within the geolocation boundary for the store location;
        generate a communication session with the second computing device using the wireless communication protocol in the store location, the second computing device executing a point of sale application;
        activate a first notification for the first computing device based at least in part on an accessibility type associated with the first computing device;

display a user interface for receiving client data, the client data comprising a product entered by a user for a purchase;
determine an expected amount for the product based at least in part on the client data entered;
transmit the expected amount to the second computing device;
receive from the second computing device a pending amount for the product, the pending amount being generated from the second computing device entering the product for the purchase; and
activate a second notification for the first computing device prior to a completion of the purchase based at least in part on the pending amount and the expected amount.

2. The system of claim 1, wherein the machine-readable instructions, when executed by the processor, cause the first computing device to at least:
determine that a difference between the pending amount and the expected amount exceeds a margin of error threshold; and
wherein the second notification indicates that the pending amount exceeds the margin of error threshold.

3. The system of claim 1, wherein activating the first notification comprises at least one of activating a vibration from a haptic device of the first computing device, displaying a user interface element on the user interface, or activating an audible sound from a speaker of the first computing device.

4. The system of claim 1, wherein the second notification comprises an approval feedback indicator for approving of the pending amount based at least in part on a difference between the pending amount and the expected amount.

5. The system of claim 1, wherein the second notification comprises at least one of a first audible sound for approving the pending amount, a second audible sound for rejecting the pending amount, a first user interface element for approving the pending amount, or a second user interface element for rejecting the pending amount.

6. The system of claim 1, wherein the accessibility type comprises at least one of: a first type for a hearing impairment, a second type for a vision impairment, or a third type for a learning impairment.

7. A method, comprising:
identifying, by a client device, the client device is located within a geolocation boundary for a store location based at least in part on location data associated with the client device;
activating, by the client device, a transceiver device of the client device to detect a second computing device at the store location using a wireless communication protocol of the transceiver device based at least in part on the client device being located within the geolocation boundary for the store location;
generating, by the client device, a communication session with the computing device in the store location using the wireless communication protocol, the computing device executing a point of sale application;
activating, by the client device, a first notification for the client device based at least in part on an accessibility type associated with the client device;
displaying, by the client device, a user interface for receiving client data, the client data comprising a product entered by a user for a purchase;
determining, by the client device, an expected amount for the product based at least in part on the client data entered;
transmitting, by the client device, the expected amount to the computing device;
receiving, by the client device, from the computing device a pending amount for the product, the pending amount being generated from the computing device entering the product for the purchase; and
activating, by the client device, a second notification for the client device prior to a completion of the purchase based at least in part on the pending amount and the expected amount.

8. The method of claim 7, further comprising:
determining, by the client device, that a difference between the pending amount and the expected amount exceeds a margin of error threshold; and
wherein the second notification indicates that the pending amount exceeds the margin of error threshold.

9. The method of claim 7, wherein activating the first notification comprises activating a vibration from a haptic device of the client device or generating an audible sound from a speaker of the client device.

10. The method of claim 7, wherein the first notification comprises an approval feedback indicator for approving of the pending amount based at least in part on a difference between the pending amount and the expected amount.

11. The method of claim 7, wherein the second notification comprises at least one of a first audible sound for approving the pending amount, a second audible sound for rejecting the pending amount, a first user interface element for approving the pending amount, or a second user interface element for rejecting the pending amount.

12. The method of claim 7, wherein the accessibility type comprises at least one of: a first type for a hearing impairment, a second type for a vision impairment, or a third type for a learning impairment.

13. The method of claim 7, wherein the second notification comprises an accept transaction component displayed in the user interface, and further comprising:
receiving a selection of the accept transaction component from the user interface; and
transmitting an approval of the purchase to the computing device.

14. The method of claim 7, wherein the wireless communication protocol comprises at least one of a Bluetooth protocol, a Wi-Fi protocol, or a Z-wave protocol.

15. A non-transitory, computer-readable medium, comprising machine-readable instructions that, when executed by a processor of a first computing device, cause the computing device to at least:
identify the first computing device is located within a geolocation boundary for a store location based at least in part on location data associated with the first computing device;
activate a transceiver device of the first computing device to detect a second computing device at the store location using a wireless communication protocol of the transceiver device based at least in part on the first computing device being located within the geolocation boundary for the store location;
generate a communication session with the second computing device using the wireless communication protocol in the store location, the second computing device executing a point of sale application;
activate a first notification for the first computing device based at least in part on an accessibility type associated with the first computing device;

display a user interface for receiving client data, the client data comprising a product entered by a user for a purchase;

determine an expected amount for the product based at least in part on the client data entered;

transmit the expected amount to the second computing device;

receive from the second computing device a pending amount for the product, the pending amount being generated from the second computing device entering the product for the purchase; and activate a second notification for the first computing device prior to a completion of the purchase based at least in part on the pending amount and the expected amount.

16. The non-transitory, computer-readable medium of claim 15, wherein the machine-readable instructions that, when executed by a processor of a computing device, cause the computing device to at least:

determine that a difference between the pending amount and the expected amount exceeds a margin of error threshold; and wherein the second notification indicates that the pending amount exceeds the margin of error threshold.

17. The non-transitory, computer-readable medium of claim 15, wherein activating the first notification comprises at least one of activating a vibration from a haptic device of the first computing device, displaying a user interface element on the user interface, or activating an audible sound from a speaker of the first computing device.

18. The non-transitory, computer-readable medium of claim 15, wherein the second notification comprises an approval feedback indicator for approving of the pending amount based at least in part on a difference between the pending amount and the expected amount.

19. The non-transitory, computer-readable medium of claim 15, wherein the wherein the second notification comprises at least one of a first audible sound for approving the pending amount, a second audible sound for rejecting the pending amount, a first user interface element for approving the pending amount, or a second user interface element for rejecting the pending amount.

20. The non-transitory, computer-readable medium of claim 15, wherein the wireless communication protocol comprises at least one of a Bluetooth protocol, a Wi-Fi protocol, or a Z-wave protocol.

* * * * *